United States Patent
Takamatsu et al.

(10) Patent No.: US 12,060,659 B2
(45) Date of Patent: Aug. 13, 2024

(54) METHOD OF PRODUCING FLAME-RESISTANT FIBER BUNDLE AND CARBON FIBER BUNDLE AND FLAMEPROOFING FURNACE

(71) Applicant: Toray Industries, Inc., Tokyo (JP)

(72) Inventors: Kohei Takamatsu, Ehime (JP); Yusuke Kuji, Ehime (JP); Naoto Hosotani, Otsu (JP); Taku Yamamoto, Otsu (JP); Kazuyuki Gondo, Otsu (JP)

(73) Assignee: Toray Industries, Inc., Tokyo (JP)

( * ) Notice: Subject to any disclaimer, the term of this patent is extended or adjusted under 35 U.S.C. 154(b) by 665 days.

(21) Appl. No.: 17/291,112

(22) PCT Filed: Nov. 7, 2019

(86) PCT No.: PCT/JP2019/043693
§ 371 (c)(1),
(2) Date: May 4, 2021

(87) PCT Pub. No.: WO2020/100714
PCT Pub. Date: May 22, 2020

(65) Prior Publication Data
US 2022/0251736 A1    Aug. 11, 2022

(30) Foreign Application Priority Data
Nov. 12, 2018    (JP) .................... 2018-212177

(51) Int. Cl.
*D01F 9/21*    (2006.01)
*C01B 32/05*    (2017.01)
*D01F 9/32*    (2006.01)

(52) U.S. Cl.
CPC .............. *D01F 9/21* (2013.01); *C01B 32/05* (2017.08); *D01F 9/328* (2013.01)

(58) Field of Classification Search
CPC ... D01F 9/21; D01F 9/328; D01F 9/22; D01F 9/32; D01F 9/225; C01B 32/05
See application file for complete search history.

(56) References Cited

U.S. PATENT DOCUMENTS

| 10,458,710 B2 | 10/2019 | Melgaard et al. |
| 2013/0171578 A1 | 7/2013 | Berner |

(Continued)

FOREIGN PATENT DOCUMENTS

| EP | 2 798 296 A1 | 11/2014 |
| JP | 10-266023 A | 10/1998 |

(Continued)

OTHER PUBLICATIONS

Extended European Search Report dated Jul. 19, 2022, of counterpart European Patent Application No. 19885909.2.

*Primary Examiner* — Daniel C. McCracken
(74) *Attorney, Agent, or Firm* — DLA Piper LLP (US)

(57) ABSTRACT

A method of producing an oxidized fiber bundle includes heat-treating an acrylic fiber bundle aligned in a heat treatment chamber in which hot air is circulated while causing the acrylic fiber bundle to run on direction-changing rollers disposed on both ends of an outside of the heat treatment chamber, wherein first hot air is supplied in a direction substantially parallel to a running direction of the acrylic fiber bundle, and second hot air is supplied from above the acrylic fiber bundle at an angle of 20 to 160° with respect to a wind direction of the first hot air, so that the second hot air passes at least a part of a running acrylic fiber bundle in a longitudinal direction.

10 Claims, 7 Drawing Sheets

(56) References Cited

U.S. PATENT DOCUMENTS

2019/0194830 A1   6/2019  Meinecke
2021/0310158 A1  10/2021  Hosotani et al.

FOREIGN PATENT DOCUMENTS

| JP | 2000-160435 A | 6/2000 | |
|----|---------------|--------|---|
| JP | 2002-266175 A | 9/2002 | |
| JP | 2007-247130 A | 9/2007 | |
| JP | 2007247130 * | 9/2007 | ............... D01F 9/22 |
| JP | 4572460 B2 | 11/2010 | |
| JP | 2011-127264 A | 6/2011 | |
| JP | 2013-542331 A | 11/2013 | |
| JP | 2018-502227 A | 1/2018 | |
| JP | 6680417 B1 | 4/2020 | |
| WO | 2018/041781 A1 | 3/2018 | |

\* cited by examiner

METHOD OF PRODUCING FLAME-RESISTANT FIBER BUNDLE AND CARBON FIBER BUNDLE AND FLAMEPROOFING FURNACE

TECHNICAL FIELD

This disclosure relates to a method of producing an oxidized fiber bundle and a carbon fiber bundle in which an acryl-based fiber bundle is continuously heat-treated, and an oxidation oven. More specifically, this disclosure relates to a method of producing an oxidized fiber bundle and a carbon fiber bundle, which enable improvement of productivity and quality of an oxidized fiber bundle, and an oxidation oven.

BACKGROUND

Carbon fiber is excellent in specific strength, specific elastic modulus, heat resistance and chemical resistance, and therefore useful as a reinforcing material for various materials, and is used in a wide range of fields such as aerospace applications, leisure applications and general industrial applications.

Generally, as a method of producing a carbon fiber bundle from an acryl-based fiber bundle, a method is known in which a fiber bundle obtained by bundling several thousands to several tens of thousands of single fibers of an acryl-based polymer is sent into an oxidation oven, and exposed to hot air in an oxidizing atmosphere of air or the like heated to 200 to 300° C. to be heat-treated (oxidation treatment), and the obtained oxidized fiber bundle is then sent into a precarbonization furnace, heat-treated in an inert gas atmosphere at 300 to 1000° C. (precarbonization treatment), and then heat-treated in a carbonization furnace filled with an inert gas atmosphere at 1000° C. or higher (carbonization treatment). In addition, the oxidized fiber bundle which is an intermediate material is widely used as a material for flame-retardant woven fabrics due to its resistance to burning.

In the process of producing a carbon fiber bundle, it is an oxidation process that requires the longest heat treatment time and consumes the largest amount of energy. Therefore, to improve productivity of carbon fiber bundles, improvement of productivity in the oxidation process is most important.

In the oxidation process, oxidation treatment is generally performed using a multi-stage horizontal heat treatment furnace (oxidation oven hereinafter) in which a fiber bundle aligned in a sheet shape is reciprocated in multiple stages on direction-changing rollers disposed at both ends on the outside of a heat treatment chamber to be heat-treated in the heat treatment chamber in which hot air is circulated.

To improve productivity in the oxidation process, it is effective that a large number of fiber bundles are conveyed at the same time to increase the density of fiber bundles in the heat treatment chamber, and the running speed of the fiber bundles is increased.

However, as the density of the fiber bundles in the heat treatment chamber is increased, the distance between adjacent fiber bundles becomes narrower so that the frequency of contact between the adjacent fiber bundles increases due to shaking and vibration of the fiber bundles. In addition, to increase the running speed of the fiber bundle and perform heat treatment required for oxidation treatment, it is necessary to increase the horizontal distance between direction-changing rollers in the oxidation oven or gain retention time in the heat treatment chamber by increasing the number of staged of the direction-changing roller. Increasing the number of stages of the direction-changing roller involves division of the building into a plurality of stories and addition of a large-scale structure to increase the load resistance of building floors and the like, thereby leading to a considerable increase in equipment cost. Therefore, to increase the running speed of the fiber bundle while keeping the equipment cost low, it is preferable to increase the horizontal distance between the direction-changing rollers. However, as the horizontal distance between the direction-changing rollers is increased, the amount of suspension of the running fiber bundle increases so that the frequency of contact between adjacent fiber bundles increases due to shaking and vibration of the fiber bundles as mentioned above. As a result, yarn gathering of fiber bundles, breaking of fiber bundles and the like frequently occur, resulting in deterioration of the quality of oxidized fiber bundles and operational troubles.

Thus, oxidation ovens are widely used in which hot air is supplied in a direction parallel to the running direction of the fiber bundle to suppress collisions between the fiber bundle and hot air in the heat treatment chamber to reduce shaking and vibration of the fiber bundle.

However, in the oxidation oven in which hot air is supplied in a direction parallel to the running direction of the fiber bundle, heat is sufficiently transferred on the surface of the aligned sheet-shaped fiber bundle, but heat is hardly transferred between adjacent fiber bundles, and the temperature of the fiber bundle excessively increases due to heat generation from the fiber bundle itself in the oxidation treatment, resulting in deterioration of the quality of the oxidized fiber bundle. When the horizontal distance between the direction-changing rollers is increased, the excessive increase in temperature of the fiber bundle on the downstream side of the circulated hot air is marked because heat on the upstream side is transported to increase the temperature on the downstream side. In addition, when the wind speed of the hot air is increased to improve heat transfer between adjacent fiber bundles, collision between the fiber bundle and the hot air is intensified so that the frequency of contact between the adjacent fiber bundles increases due to shaking and vibration of the fiber bundles, resulting in deterioration of the quality of oxidized fiber bundles and operational troubles.

Further, to send the fiber bundle into the heat treatment chamber and send the fiber bundle from the heat treatment chamber, a supply nozzle and a suction nozzle for hot air are disposed separately from each other in a vertical direction, and in a gap between the nozzles, there is no flow of hot air and high-temperature hot air influenced by heat generation from the fiber bundle itself so that as mentioned above, the temperature of fiber bundle excessively increases, resulting in deterioration of the quality of the oxidized fiber bundle.

National Publication of International Patent Application No. 2013-542331 proposes an oxidation oven in which the wind direction angle of hot air is defined so that the hot air crosses at an angle other than 0° and 90°, preferably at an angle of 0.8° to 3°, with respect to the running direction of aligned sheet-shaped fiber bundles for improving the heat transfer between adjacent fiber bundles while suppressing shaking and vibration of the fiber bundles.

In addition, National Publication of International Patent Application No. 2018-502227 proposes an oxidation oven in which openings are provided on the upper and lower surfaces of a supply nozzle to supply hot air between nozzles for improving the heat transfer of fiber bundles between nozzles.

However, in the oxidation oven described in JP '331, improvement of heat transfer between adjacent fiber bundles is taken into consideration, but the heat transfer of fiber bundles between nozzles is not mentioned, and an excessive increase in temperature of the fiber bundles between the nozzles cannot be avoided. In addition, a wind direction angle of hot air with consideration given to shaking and vibration of fiber bundles is presented, but since hot air crosses between adjacent fiber bundles over the entire length of a heat treatment chamber, the frequency of collision between the fiber bundle and the hot air increases so that shaking and vibration of the fiber bundles are not reduced, and improvement of productivity in the oxidation process is insufficient.

In addition, in the oxidation oven described in JP '227, the heat transfer of fiber bundles between nozzles is taken into consideration, but shaking and vibration of the fiber bundle are not mentioned, and improvement of productivity in the oxidation process is insufficient as mentioned above.

It could therefore be helpful to improve productivity and quality of an oxidized fiber bundle by reducing shaking and vibration of the fiber bundle while improving the heat transfer of the fiber bundle in a method of producing an oxidized fiber bundle using an oxidation oven in which hot air is supplied in a direction parallel to the running direction of the fiber bundle, and the oxidation oven.

SUMMARY

We thus provide a method of producing an oxidized fiber bundle having the following configuration, namely, in a method of producing an oxidized fiber bundle including heat-treating an acrylic fiber bundle being aligned in a heat treatment chamber in which hot air is circulated while causing the acrylic fiber bundle to run on direction-changing rollers disposed on both ends of an outside of the heat treatment chamber, first hot air is supplied in a direction substantially parallel to a running direction of the acrylic fiber bundle, and second hot air is supplied from above the acrylic fiber bundle at an angle of 20 to 160° with respect to a wind direction of the first hot air so that the second hot air passes at least a part of a running acrylic fiber bundle in a longitudinal direction.

The "direction substantially parallel to the running direction of the fiber bundle" is a direction within the range of ±0.7° with respect to the horizontal line between the tops of a pair of opposed direction-changing rollers disposed at both ends on the outside of the heat treatment chamber.

In addition, in the method of producing a carbon fiber bundle, the oxidized fiber bundle obtained by the above-described method is subjected to precarbonization treatment at a maximum temperature of 300 to 1000° C. in an inert gas to obtain a precarbonized fiber bundle, and the precarbonized fiber bundle is subjected to carbonization treatment at a maximum temperature of 1000 to 2000° C. in an inert gas.

Further, the oxidation oven is,
an oxidation oven for heat-treating an acryl-based fiber bundle including:
(i) a heat treatment chamber having a slit through which aligned fiber bundles can enter and exit;
(ii) a plurality of supply nozzles disposed separately from one another in a vertical direction apart in the heat treatment chamber and supplying first hot air in a direction substantially parallel to a running direction of the fiber bundle;
(iii) a plurality of suction nozzles disposed separately from one another in a vertical direction in the heat treatment chamber and suctioning hot air supplied from the supply nozzle;
(iv) at least one blower that circulates hot air through the supply nozzle and the suction nozzle;
(v) at least one heater disposed on a flow channel for circulated hot air; and
(vi) a direction-changing roller disposed outside the heat treatment chamber and reciprocating the fiber bundle two or more times in the heat treatment chamber through gaps between the adjacent suction nozzles,
the oxidation oven including
(vii) openings on lower surfaces of supply nozzles for supplying second hot air at an angle of 20 to 160° with respect to a wind direction of the first hot air and allowing passage of at least a part of a running fiber bundle in a longitudinal direction.

In the method of producing oxidized fiber bundle, a downward wind speed of the second hot air passing through the acrylic fiber bundle is preferably ⅓ to ⅚ of a wind speed of the first hot air flowing around the acrylic fiber bundle.

A volume of hot air flowing downward in the second hot air during supply is preferably ⅙ to ½ of a volume of the first hot air during supply.

A horizontal distance between the direction-changing rollers disposed at both ends on the outside of the heat treatment chamber is preferably 15 m or more.

It is preferable that the second hot air passes through the acrylic fiber bundle at a position of 40 to 60% of a distance from the direction-changing roller located at one end to the direction-changing roller located at the other end of the outside of the heat treatment chamber.

In the oxidation oven, the opening is formed of a porous plate, and a pore size of the porous plate is preferably 10 to 30 mm.

An aperture ratio of the porous plate is preferably 20 to 60%.

It is preferable that the supply nozzle is disposed at a center of the heat treatment chamber and the suction nozzles are disposed at both ends of the heat treatment chamber.

According to our method of producing an oxidized fiber bundle and a carbon fiber bundle, the heat transfer of the fiber bundle is improved by second hot air, and a downforce of pressing the fiber bundle acts in a vertically downward direction which is the same direction as the suspension direction of the fiber bundle so that an effect similar to fixation of the fiber bundle at a fixed point is produced to enable reduction of shaking and vibration of the fiber bundle. As a result, it is possible to improve productivity and quality of the oxidized fiber bundle and the carbon fiber bundle.

In addition, since our oxidation oven is used, the heat transfer of the fiber bundle between nozzles in which an excessive increase in temperature of the fiber bundle is most likely to occur is improved by second hot air, and a downforce of pressing the fiber bundle acts in a vertically downward direction which is the same direction as the suspension direction of the fiber bundle so that an effect similar to fixation of the fiber bundle at a fixed point is produced to enable reduction of shaking and vibration of the fiber bundle. As a result, it is possible to improve productivity and quality of the oxidized fiber bundle.

DESCRIPTION OF REFERENCE SIGNS

Figure 1:
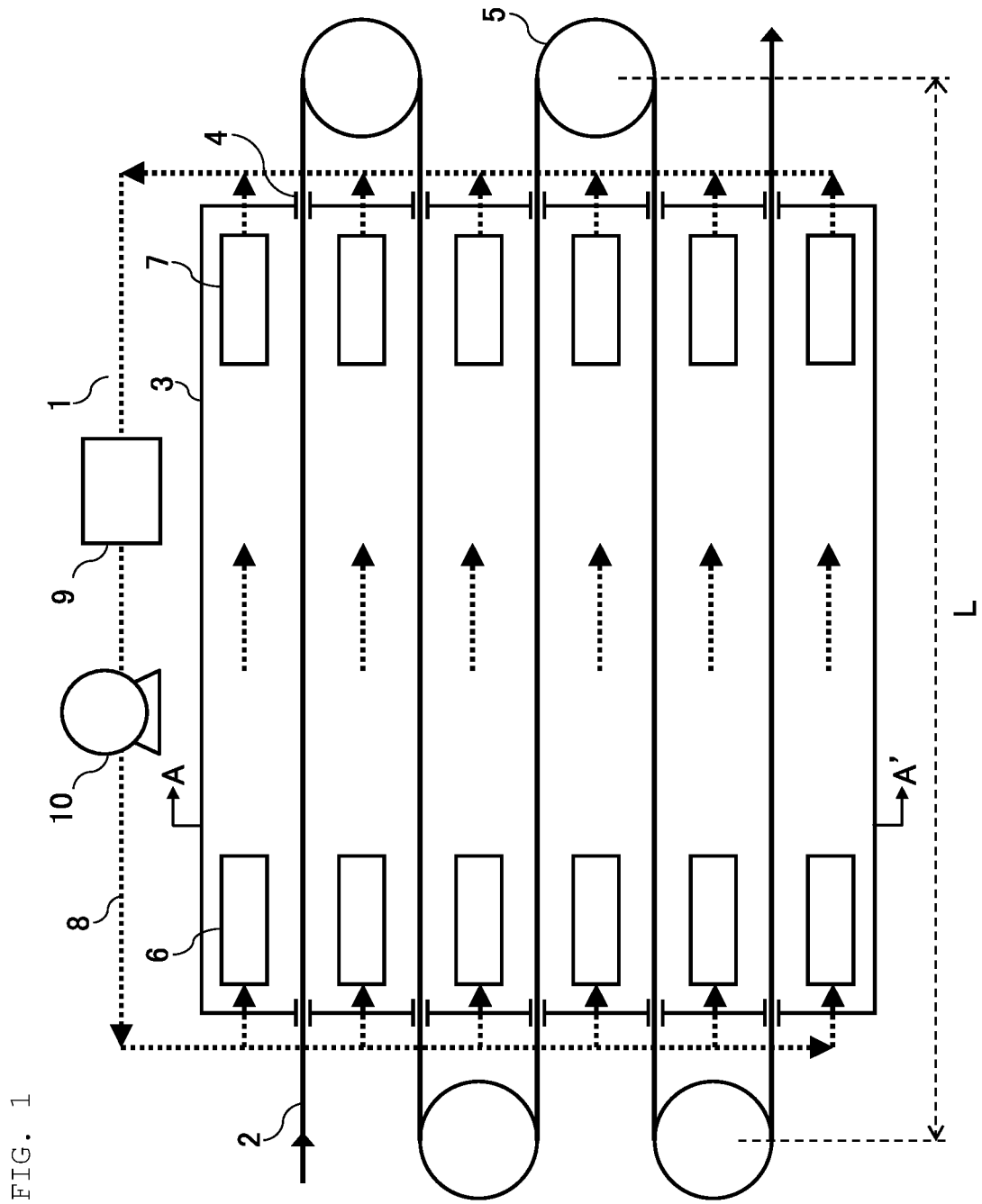
FIG. 1 is a schematic side view of an oxidation oven that produces an oxidized fiber bundle.

1: Oxidation oven
2: Fiber bundle
3: Heat treatment chamber
4: Slit
5: Direction-changing roller
6: Supply nozzle
7: Suction nozzle
8: Hot air circulation flow channel
9: Heater
10: Blower
11: Hot air supply apparatus
12: Opening
13: Porous plate
L: Horizontal distance between direction-changing rollers
Wp: Physically regulated pitch interval
Wy: Width of running fiber bundle
t: Gap distance between adjacent fiber bundles

DETAILED DESCRIPTION

We provide a method of oxidizing a fiber bundle in an oxidizing atmosphere. The method will be described with an oxidation oven 1 of end to end (ETE) type in which hot air is circulated from one end to the other end of a heat treatment chamber shown in FIG. 1.

The oxidation oven 1 includes a heat treatment chamber 3 in which oxidation treatment is performed by blowing hot air to a fiber bundle 2 running on a multi-stage running area while changing the direction. The fiber bundle 2 is sent into the heat treatment chamber 3 from a slit 4 provided on a side wall of the heat treatment chamber 3 of the oxidation oven 1, runs linearly in the heat treatment chamber 3, and is then sent out of the heat treatment chamber 3 from the slit 4 on the opposed side wall. Thereafter, the fiber bundle is caused to change the direction by direction-changing rollers 5 disposed at both ends of the outside of the heat treatment chamber 3, and runs to be sent into the heat treatment chamber 3 again. In this way, the fiber bundle 2 is sent into the heat treatment chamber 3 and sent out of the heat treatment chamber 3 two or more times by a plurality of direction-changing rollers 5, and moves generally from the upper part to the lower part of FIG. 1 in multiple stages in the heat treatment chamber 3. The moving direction of the fiber bundle 2 and the number of stages of the direction-changing roller 5 are not limited to those described above.

Figure 2:
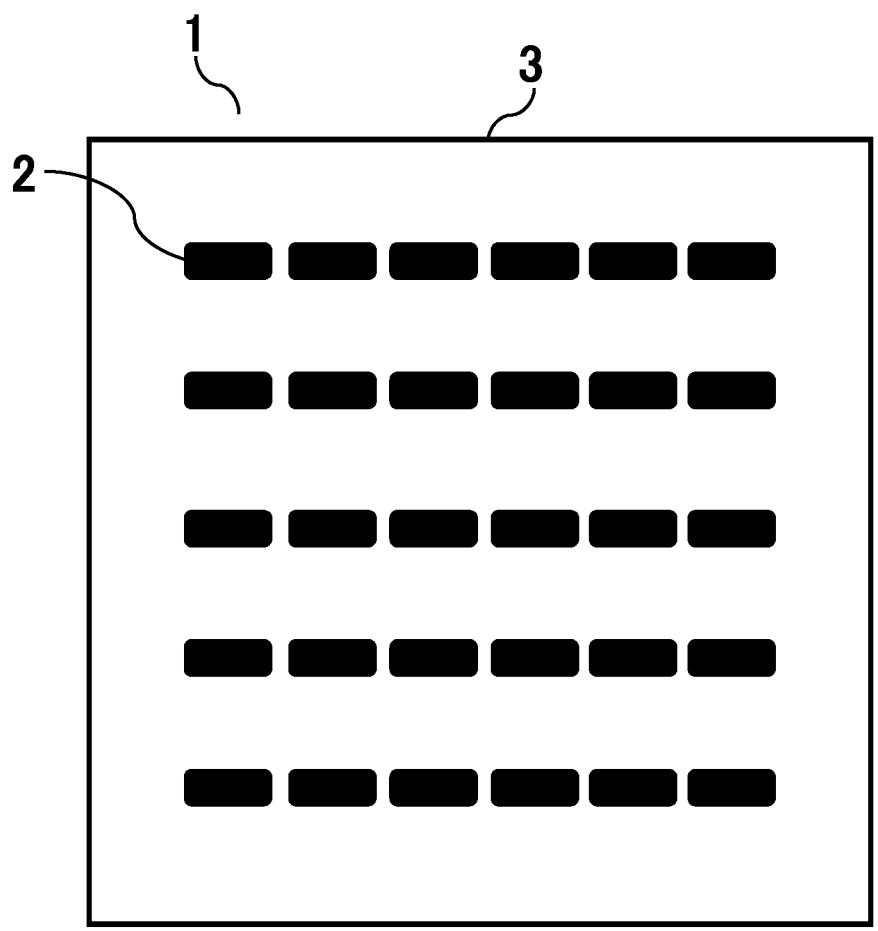
FIG. 2 is a cross-sectional view taken along line A-A' of the oxidation oven of FIG. 1.

As shown in FIG. 2, the fiber bundle 2 has a wide sheet-shaped form in which a plurality of fiber bundles 2 are aligned side by side in a direction perpendicular to the paper plane. While running in the heat treatment chamber 3 while changing the direction, the fiber bundle is subjected to oxidation treatment with hot air at about 200 to 350° C. in the heat treatment chamber 3 to turn into an oxidized fiber bundle.

The hot air in the heat treatment chamber 3 is an oxidizing gas such as air, which is supplied to the heat treatment chamber 3 by a supply nozzle 6 disposed at one end of the heat treatment chamber, and flows along the running direction of the fiber bundle 2 toward a suction nozzle 7 disposed at the other end of the heat treatment chamber. The hot air is then discharged from the hot air suction nozzle to the outside of the heat treatment chamber 3, guided to a hot air circulation flow channel 8, heated by a heater 9 disposed on the hot air circulation flow channel 8, has its wind speed controlled by a blower 10, and is then supplied to the heat treatment chamber 3 from the supply nozzle 6. The supplied hot air flows through the heat treatment chamber 3 along the running direction of the fiber bundle 2, and is then discharged from the suction nozzle 7 again so that the hot air circulation in the oxidation oven 1 is repeated. Such a hot air circulation type oxidation oven 1 can moderately apply oxygen and heat to the fiber bundle 2, and repeatedly circulates an oxidizing gas heated to a high temperature so that good thermal efficiency is obtained.

A plurality of supply nozzles 6 and suction nozzles 7 are provided at upper and lower positions of the fiber bundle 2, and disposed separately from one another in a vertical direction in the heat treatment chamber 3. The fiber bundle 2 can pass through gaps between the nozzles. In addition, a pair of the supply nozzle 6 and the suction nozzle 7 opposed to each other are disposed in a direction parallel to the running direction of the fiber bundle 2. The running direction of the fiber bundle is a linear direction connecting two points at a position where the fiber bundle separates from one of a pair of opposed direction-changing rollers disposed at both ends of the outside of the heat treatment chamber and a position where the other direction-changing roller contacts the fiber bundle similarly to the definition described above.

Preferably, a resistor such as a porous plate and a rectifying member such as a honeycomb are provided on the supply surface of the supply nozzle 6 to impart a pressure loss so that the hot air supplied to the heat treatment chamber 3 is rectified.

As with the supply nozzle 6, a resistor such as a porous plate may be provided on the suction surface of the suction nozzle 7 to impart a pressure loss. In addition, if necessary, foreign substance removing means for filtering out foreign substances such as tar in the circulating hot air may be provided. The foreign substance removing means is not particularly limited, and examples thereof include a porous plates such as wire nets and punching plates.

If necessary, the hot air circulation flow channel 8 may be provided with foreign substance removing means for filtering out foreign substances such as tar in the circulating hot air. The foreign substance removing means is not particularly limited, and examples thereof include a porous plates such as wire nets and punching plates. In addition, an exhaust line (not shown) that exhausts a part of the circulated hot air or a supply line (not shown) that supplies clean hot air may be provided to promote exchange of the circulated hot air in the heat treatment chamber 3.

The heater 9 is not particularly limited as long as it is capable of heating the hot air to a desired temperature and, for example, an electric heater or the like is used.

The blower 10 is not particularly limited as long as it has desired performance and, for example, an axial fan or the like is used.

In the oxidation oven 1 shown in FIG. 1, it is necessary to reduce shaking and vibration of the fiber bundle 2 while improving the heat transfer of the fiber bundle 2 as described above for improving productivity and quality of the oxidized fiber bundle.

To quantify the shaking and vibration of the fiber bundle 2, the "contact probability P between adjacent fiber bundles" is used as an index. The "contact probability P between adjacent fiber bundles" is a probability that gaps between adjacent fiber bundles are eliminated due to vibration of the fiber bundles in the width direction when a plurality of fiber bundles are caused to run side by side to be adjacent to one another. For the vibration of the fiber bundles in the width direction, the contact probability P between adjacent fiber bundles is defined by the following formula provided that the average amplitude of vibration is 0 and the standard deviation is a:

$$P=[1-p(x)\{-t<x<t\}]\times 100.$$

P is a contact probability between adjacent fiber bundles (%), t is a gap between adjacent fiber bundles (mm), p(x) is a probability density function of a normal distribution $N(0, \sigma^2)$, σ is a standard deviation of an amplitude of vibration, and x is a random variable where the center of the amplitude of vibration is zero.

Figure 3:
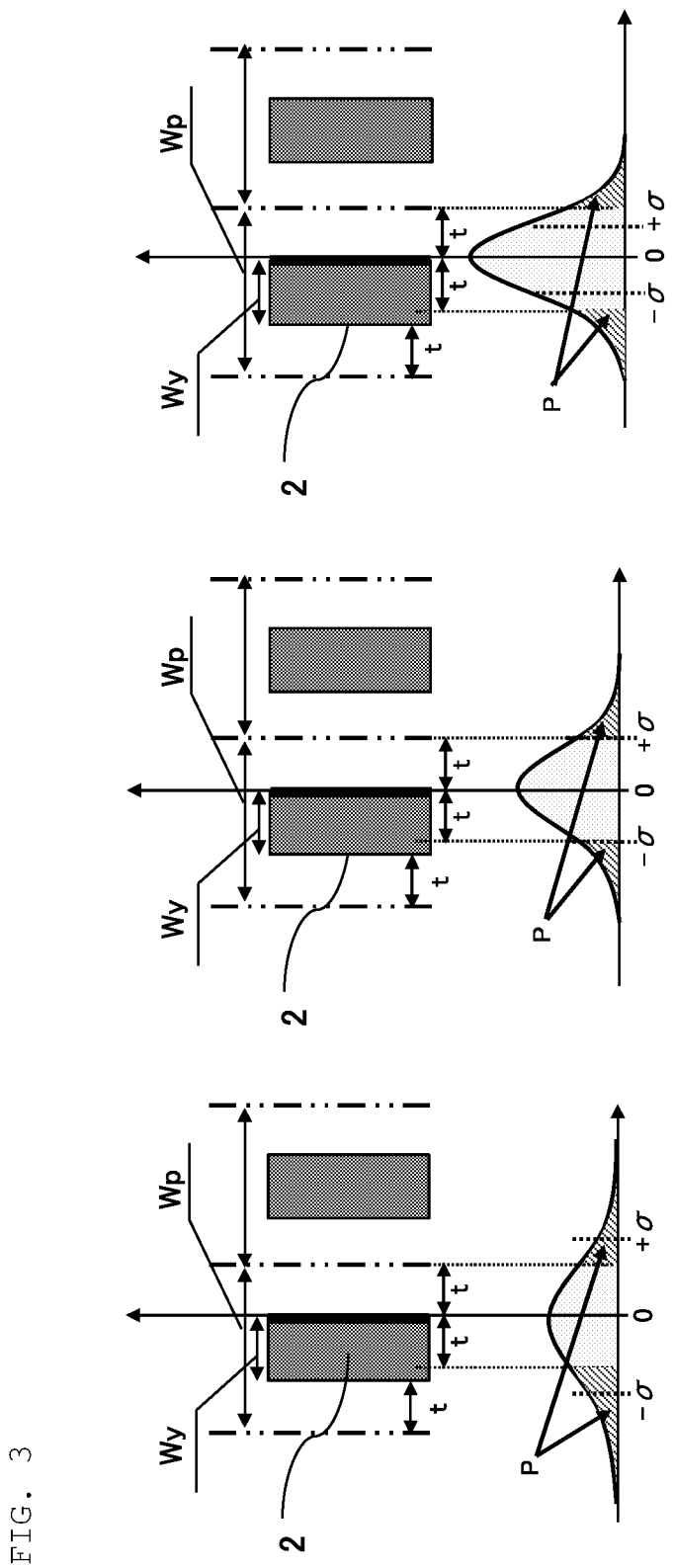
FIG. 3 is an image diagram illustrating a contact probability P between adjacent fiber bundles.

FIG. 3 is an image diagram of the contact probability P between adjacent fiber bundles, where a plurality of running fiber bundles are shown in the upper part, and a probability distribution centering on the right end of the fiber bundle at the center of the upper part is shown in the lower part. The fiber bundle vibrates, and accordingly, the gap distance t between adjacent fiber bundles and the standard deviation σ of the amplitude of vibration constantly change. The gap distance t between adjacent fiber bundles can be expressed by the following equation:

$$t=(Wp-Wy)/2.$$

Wp is a pitch interval (mm) physically regulated by the direction-changing roller or the like, and Wy is a width (mm) of the running fiber bundle.

FIG. 3 is an image diagram for t<1σ, t=1σ and t>1σ in this order from the left. P corresponds to the shaded area in the lower part of FIG. 3. P is a cumulative probability of being below/above the position of the running end of adjacent fiber bundles (range of t where the position of a reference fiber bundle is 0) on the assumption that the amplitude of vibration of the fiber bundles is a normal distribution. P can be calculated statistically by actually measuring Wy and σ.

The contact probability P between adjacent fiber bundles is preferably 2% or more and 18% or less, more preferably 5 to 16%. When the contact probability P between adjacent fiber bundles is in the above-described preferred range, the yarn density is not excessively low, and a decrease in production efficiency can be prevented, while yarn gathering between adjacent fiber bundles does not increase, and deterioration of the quality of oxidized fiber bundles such as fuzz formation and operational troubles such as yarn break can be suppressed.

The amplitude of vibration of the fiber bundle and the width of the running fiber bundle can be measured, for example, with a high-precision two-dimensional displacement sensor or the like from above or below the running fiber bundle.

In the method of producing an oxidized fiber bundle, the first hot air is supplied in a direction substantially parallel to the running direction of the fiber bundle 2, and simultaneously, the second hot air is supplied from above the fiber bundle 2 at an angle of 20 to 160° with respect to the first hot air, and allowed to pass through at least a part of the running fiber bundle 2 in the longitudinal direction. The second hot air passes through the fiber bundle 2 and then joins the first hot air. When the second hot air is supplied from above the fiber bundle 2, a downforce of pressing the fiber bundle 2 acts in a vertically downward direction which is the same direction as the suspension direction of the fiber bundle 2 so that an effect similar to fixation of a part of the running fiber bundle 2 at a fixed point is produced to reduce shaking and vibration of the fiber bundle 2 and ensure that the shaking and vibration hardly propagate in the longitudinal direction of the fiber bundle 2. Further, since the hot air passes between adjacent fiber bundles 2, the heat transfer of the fiber bundles 2 at a portion through which the hot air passes is improved.

Figure 4:
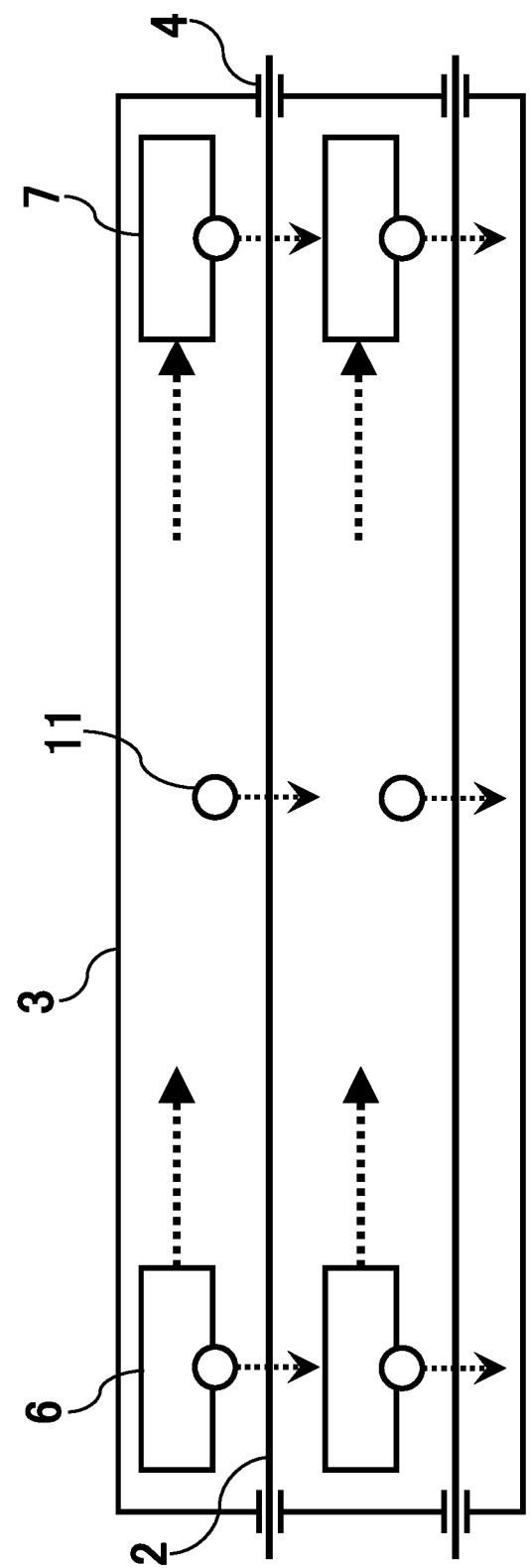
FIG. 4 is a schematic enlarged side view of the oxidation oven of FIG. 1.

The oxidation oven 1 includes a hot air supply apparatus 11 that supplies the second hot air into gaps between the supply nozzles 6 and the suction nozzles 7 as shown in FIG. 4, or supplies the second hot air into the heat treatment chamber 3 from above the fiber bundle 2 as shown in FIG. 4.

Figure 5:
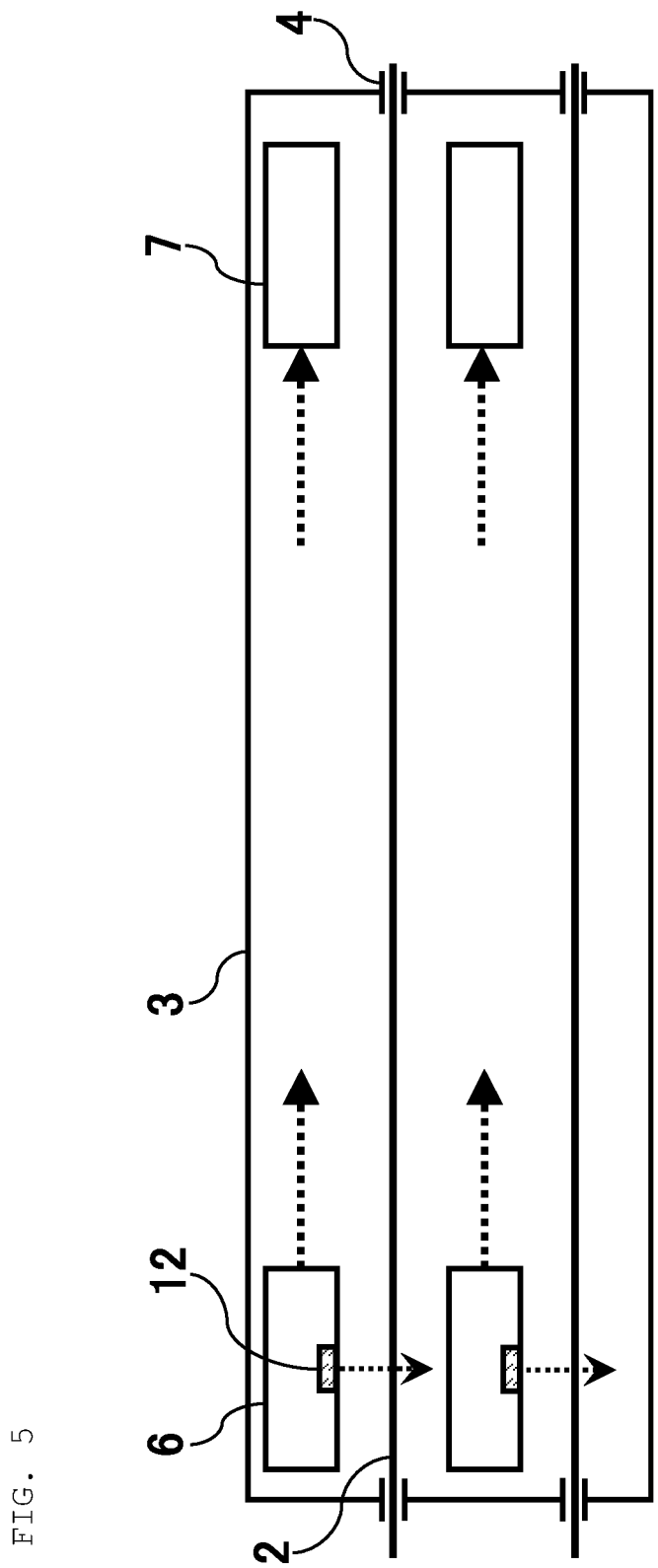
FIG. 5 is a schematic enlarged side view of another aspect of the oxidation oven of FIG. 1.

Alternatively, as shown in FIG. 5, an opening 12 that supplies the second hot air is provided on the lower surface of the supply nozzle 6. By supplying the second hot air through the opening 12 on the lower surface of the supply nozzle, the heat transfer between nozzles in which the heat transfer of the fiber bundles 2 is the smallest is improved so that the risk of an excessive increase in temperature of the fiber bundles 2 is considerably reduced. Further, in the supply nozzle 6 having a positive pressure with respect to the heat treatment chamber 3, second hot air can be supplied only by providing the opening 12 without necessity to provide an excess structure in the heat treatment chamber 3, resulting in reduction of equipment cost. FIGS. 4 and 5 show a mere example, the configuration in which the second hot air is supplied from above the fiber bundle 2 is not limited thereto.

The heat transfer of the fiber bundle 2 is improved as the number of supply points for the second hot air, and if there are an excessive number of supply points, collision between the fiber bundle 2 and the second hot air becomes excessively large, shaking and vibration of the fiber bundle 2 increase. The shaking and vibration of the fiber bundle 2 are influenced by the horizontal distance L between the direction-changing rollers 5, the wind speed of hot air circulated in the heat treatment chamber 3, and the tension of the running fiber bundle 2, and for reducing the shaking and vibration of the fiber bundle 2, the number of second hot air supply points is preferably 1 to 5, more preferably 1 to 3.

The wind direction of the second hot air is preferably 20 to 160°, more preferably 45 to 135° with respect to the wind direction of the first hot air. When the wind direction meets the above-described range, the second hot air can pass between adjacent fiber bundles 2 even if the density of the fiber bundles 2 in the heat treatment chamber 3 is increased to improve productivity, and thus the heat transfer of the fiber bundles 2 is improved. In addition, since the second hot air passes between adjacent fiber bundles 2 even without increasing the wind speed, it is possible to effectively shaking and vibration of the fiber bundles 2 while suppressing collision between the fiber bundle 2 and the second hot air.

Of the second hot air, the downward wind speed of hot air passing through the fiber bundle 2 is preferably ⅓ to ⅚, more preferably ½ to ⅔, of the wind speed of the first hot air flowing around the fiber bundle 2. When the wind speed is within the above-described range, the effect of a downforce of pressing the fiber bundle 2 in a vertically downward direction while suppressing the collision between the fiber bundle 2 and the second hot air can be sufficiently obtained, and therefore it is possible to effectively reduce shaking and vibration of the fiber bundles 2.

The volume of hot air flowing downward in the second hot air during supply is preferably ⅙ to ½, more preferably ¼ to ⅓, of the volume of the first hot air during supply. The volume of the first hot air during supply refers to the volume of the first hot air supplied through the one supply nozzle 6, and the volume of the second hot air during supply refers to the volume of the second hot air supplied from one hot air supply apparatus 11 or through the opening 12 on the lower surface of the supply nozzle. When the volume of hot air flowing downward in the second hot air during supply is a volume within the above-mentioned range, it is possible to supply the second hot air satisfying the above-described wind speed range without disturbing the flow of the first hot air. In addition, since the contact area between the second hot air and the fiber bundle 2 decreases, and the effect of a downforce of pressing the fiber bundle 2 in a vertically downward direction while suppressing the collision between the fiber bundle 2 and the second hot air can be obtained, it is possible to effectively reduce shaking and vibration of the fiber bundles 2.

In the oxidation oven 1, the horizontal distance L between the direction-changing rollers 5 is preferably 15 m or more. When the horizontal distance L between the direction-changing rollers 5 is 15 m or more, it is possible to gain retention time in the heat treatment chamber 3 in 20 or less stages of direction-changing rollers without reducing the running speed of the fiber bundle 2 to half the conventional running speed. Therefore, it is possible to reduce the equipment cost of the oxidation oven 1 while maintaining the production amount per unit time of oxidized fiber bundles and carbon fiber bundles as products, and as a result, productivity of oxidized fiber bundles and carbon fiber bundles can be improved. When the horizontal distance L between the direction-changing rollers 5 is increased, heat on the upstream side is transported to increase the temperature on the downstream side of the circulated hot air, and therefore when the second hot air is supplied to the downstream side to improve the heat transfer of the fiber bundle 2, an excessive increase in temperature of the fiber bundle 2 can be avoided, and the horizontal distance L between direction-changing rollers 5 can be set to 15 m or more without deteriorating the quality.

It is preferable that the second hot air passes through the fiber bundle 2 at a position of 40 to 60% of the distance from the direction-changing roller 5 located at one end to the direction-changing roller 5 located at the other end of the outside of the heat treatment chamber 3. By enhancing the effect of fixing the fiber bundle 2 at a fixed point near the center of the horizontal distance L between the direction-changing rollers 5 where the amplitude of vibration of the shaking and vibration of the fiber bundle 2 is maximized by the second hot air, the shaking and vibration of the fiber bundle 2 can be efficiently reduced.

Figure 6:
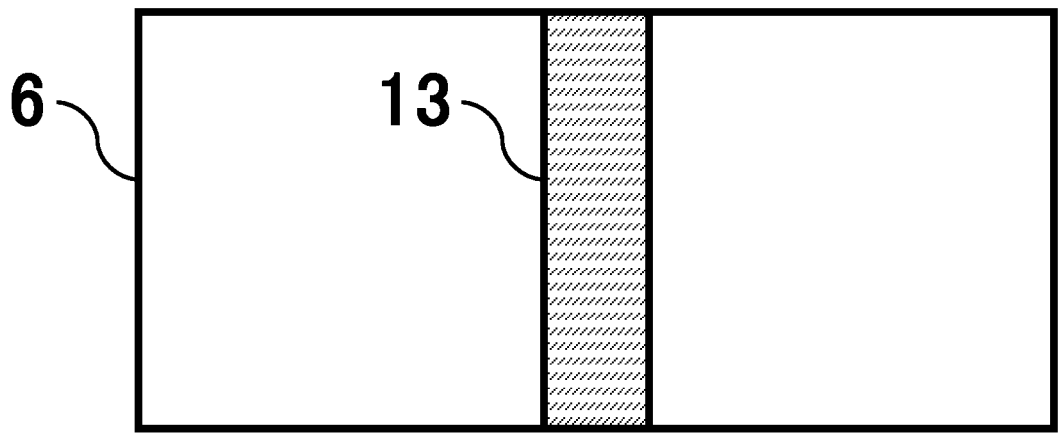
FIG. 6 is a schematic view of a lower surface of a supply nozzle of FIG. 4.

It is preferable to provide a porous plate 13 as an opening 12 on the lower surface of the supply nozzle 6 as shown in FIG. 6. The porous plate 13 can give a moderate pressure loss to supply the uniformly rectified second hot air. The pore size and aperture ratio of the porous plate 13 are appropriately determined as necessary.

The pore size of the porous plate 13 is preferably 10 to 30 mm. When the pore size is within the above-described range, the risk of clogging the porous plate 13 by foreign substances such as tar contained in the circulated hot air is reduced to enable continuous operations for a long period of time. In addition, since a moderate pressure loss can be given, the second hot air is sufficiently rectified, and uniform second hot air is supplied in the width direction of the oxidation oven 1 to improve the quality of the oxidized fiber bundle.

The aperture ratio of the porous plate 13 is preferably 20 to 60% with the pore size being within the above-described range. When the aperture ratio is within the above-described range, the second hot air can be supplied to the fiber bundle 2 even without increasing the volume of hot air, and therefore it is possible to effectively shaking and vibration of the fiber bundles 2 while suppressing collision between the fiber bundle 2 and the second hot air. In addition, the second hot air is sufficiently rectified, and uniform second hot air is supplied in the width direction of the oxidation oven 1 to improve the quality of the oxidized fiber bundle.

Figure 7:
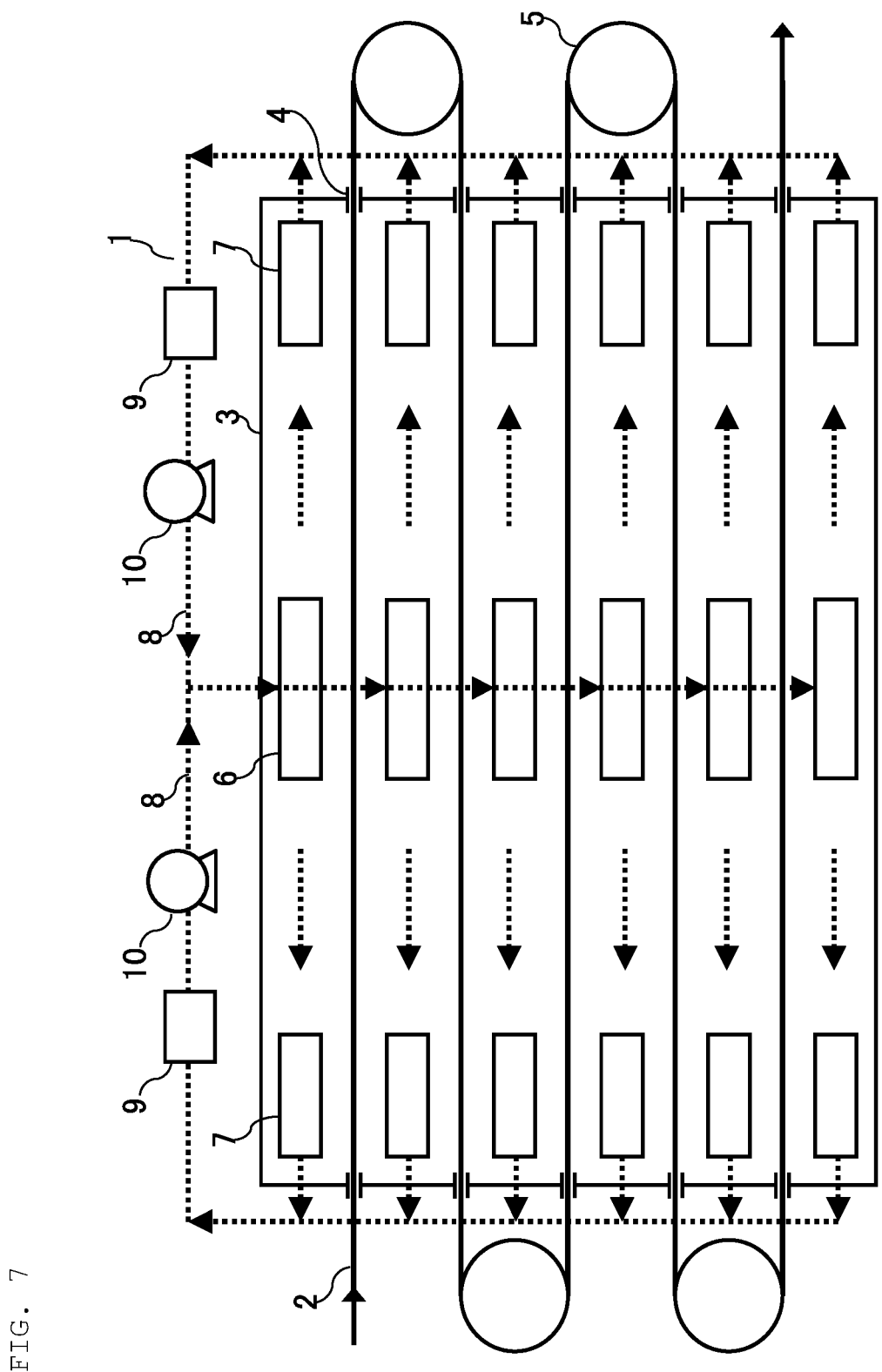
FIG. 7 is a schematic side view of another aspect of the oxidation oven of FIG. 1.

Our methods can be applied even in an oxidation oven of center to end (CTE) type in which hot air is circulated from the center to both ends of the heat treatment chamber 3 shown in FIG. 7. The oxidation oven of CTE type has a configuration in which the supply nozzle 6 is disposed at the center of the heat treatment chamber 3 and the suction nozzle 7 is disposed at both ends of the heat treatment chamber 3. As described above, the center of the heat treatment chamber 3 at which the supply nozzle 6 is disposed is near the center of the horizontal distance L between the direction-changing rollers 5, where the suspension of the fiber bundle 2 is maximized, and therefore supply of the second hot air from the lower surface of the supply nozzle 6 enables efficient reduction of shaking and vibration of the fiber bundles. In addition, since the first hot air is supplied to the heat treatment chamber 3 divided into two parts, an excessive increase in temperature of the fiber bundle 2 on the downstream side of the circulated hot air is less likely to occur as compared to the oxidation oven 1 of ETE type shown in FIG. 1, and the horizontal distance L between the direction-changing rollers 5 can be increased.

The oxidized fiber bundle produced by the method of producing an oxidized fiber bundle is subjected to precarbonization treatment at a maximum temperature of 300 to 1000° C. in an inert gas to obtain a precarbonized fiber bundle, and the precarbonized fiber bundle is subjected to carbonization treatment at a maximum temperature of 1000 to 2000° C. in an inert gas, whereby a carbon fiber bundle can be produced.

The maximum temperature of the inert gas in the precarbonization treatment is preferably 550 to 800° C. As the inert gas that fills the precarbonization furnace, a known inert gas such as nitrogen, argon or helium can be used, and nitrogen is preferable from the viewpoint of economic efficiency.

The precarbonized fiber bundle obtained by the precarbonization treatment is then sent into a carbonization furnace to be subjected to carbonization treatment. To improve the mechanical properties of the carbon fiber bundle, it is preferable to perform carbonization treatment at a maximum temperature of 1200 to 2000° C. in an inert gas.

EXAMPLES

Examples of our ovens and methods will be described, but this disclosure is not limited thereto. For each Example and Comparative Example, the measured values obtained by the following measuring methods were used.

Method of Measuring Wind Speeds of First Hot Air and Second Hot Air

The average of 30 measured values per second was determined as a wind speed using an Anemomaster wind meter at a high temperature Model 6162 manufactured by KANOMAX JAPAN INC. For first hot air, a measuring probe was inserted at the running position of a fiber bundle 2 at the center position of the direction-changing rollers 5 on both sides of an oxidation oven 1 through a measuring hole (not shown) on a lateral surface of a heat treatment chamber 3, and the wind speed of the first hot air flowing in a direction substantially parallel to the running direction of the fiber bundle 2 was measured at five points in the width direction. For second hot air, a measuring probe was inserted at the running position of the fiber bundle 2 immediately below the supply position through the measuring hole (not shown) on the lateral surface of the heat treatment chamber 3, and the wind speed of the second hot air flowing in a vertically downward direction with respect to the wind direction of the first hot air was measured at five points in the width direction. By the above-described method, the observation of a wind speed exceeding 0 at all the five measurement points in the width direction means that the second hot air passes through the fiber bundle 2. In addition, for the wind direction of the second hot air, the above-described measurement was performed with measuring probe rotated, and a wind direction corresponding to the maximum wind speed was defined as the wind direction of the second hot air.

Method of Measuring Volumes of First Hot Air and Second Hot Air

For the first hot air, a measuring probe was inserted into the supply surface of the supply nozzle 6 through the measuring hole (not shown) on the lateral surface of the heat treatment chamber 3, the wind speed of the first hot air was measured at five points in the width direction, and the volume of the first hot air during supply was calculated from the average of the wind speeds and the nozzle supply area of the supply nozzle 6. For the second hot air, a measuring probe was inserted into a hot air supply apparatus 11 or immediately below an opening 12 on the lower surface of the supply nozzle through the measuring hole (not shown) on the lateral surface of the heat treatment chamber 3, the downward wind speed of the second hot air was measured at five points in the width direction, and the volume of hot air flowing downward in the second hot air during supply was calculated from the average of the wind speeds and the second hot air supply area.

Method of Measuring Width of Fiber Bundle and Amplitude of Vibration of Running Fiber Bundle The measurement was performed at the center position between the direction-changing rollers 5 on both sides of the oxidation oven 1 at which the amplitude of vibration of the running fiber bundle was maximized. Specifically, a laser displacement meter LJ-G200 manufactured by KEYENCE CORPORATION was installed above or below the running fiber bundle to irradiate a specific fiber bundle 2 with laser light. The distance between both ends of the fiber bundle 2 in the width direction was defined as a width of fiber bundle, and the amount of width-direction variation at one end in the width direction was defined as an amplitude of vibration. The measurement was performed for 5 minutes at a frequency of 1 time/60 seconds or more and an accuracy of 0.01 mm to obtain an average of widths of fiber bundles (Wy) and a standard deviation of the amplitude of vibration ($\sigma$), and the above-described "contact probability P between adjacent fiber bundles" was calculated.

Tables 1 and 2 show the qualitatively evaluated results of process-stability, quality and productivity in Examples and Comparative Examples. "Excellent," "Good" and "Poor" are based on the following criteria.

Process Stability
Excellent: Extremely good level, where troubles such as yarn gathering and fiber bundle break occur at a frequency of less than one time/day on average.
Good: Level at which continuous operation can be continued, where troubles such as yarn gathering and fiber bundle break occur at a frequency of several times/day on average.
Poor: Level at which continuous operation cannot be continued, where troubles such as yarn gathering and fiber bundle break occur at a frequency of several tens of times/day on average.

Quality
Excellent: Fuzz quality has no effect on the passability in the process and the high-order processability as a product, where the number of fuzzes of 10 mm or more on the fiber bundle, which can be visually observed after the oxidation process, is a single digit/m or less on average.
Good: Fuzz quality has little effect on the passability in the process and the high-order processability as a product, where the number of fuzzes of 10 mm or more on the fiber bundle, which can be visually observed after the oxidation process, is 10/m or less on average.
Poor: Fuzz quality has an adverse effect on the passability in the process and the high-order processability as a product, where the number of fuzzes of 10 mm or more on the fiber bundle, which can be visually observed after the oxidation process, is several tens or more on average.

Productivity
Excellent: Level at which the production cost is 80% or less over the conventional production cost, or the production amount per unit time is 120% or more over the conventional production amount per unit time.
Good: Level at which the production cost and the production amount per unit time are equivalent to the conventional production cost and the production amount per unit time.
Poor: Level at which the production cost is 150% or more over the conventional production cost, or the production amount per unit time is 60% or less over the conventional production amount per unit time.

Example 1

100 to 200 acryl-based fiber bundles having a single fiber fineness of 0.11 tex and including 20000 single fibers were aligned in a sheet shape to be parallel to one another, and heat-treated in an oxidation oven 1 to obtain an oxidized fiber bundle. The oxidation oven 1 was of CTE type in which the horizontal distance L between direction-changing rollers 5 disposed at both ends on the outside of a heat treatment chamber 3 is 20 m, a supply nozzle 6 is disposed at the center of the heat treatment chamber 3, and suction nozzles 7 are disposed at both ends of the heat treatment chamber 3. An opening 12 was provided on the lower surface of the supply nozzle 6 using a porous plate 13. The openings 12 were provided at positions of 48% and 52% of the distance from the direction-changing roller 5 located at one end to the direction-changing roller 5 located at the other end of the outside of the heat treatment chamber. The porous plate 13 used for the opening 12 had a pore size of 20 mm and an aperture ratio of 30%. The wind direction of first hot air was a direction substantially parallel to the running direction of the fiber bundle 2, and the wind direction of second hot air was at 90° with respect to the first hot air. The downward wind speed of the second hot air passing through the fiber bundle 2 was ½ of that of the first hot air flowing around the fiber bundle 2. Each of the temperature of the first and second hot airs was 240 to 280° C. In addition, the direction-changing roller 5 was a groove roller having grooves at a predetermined interval (pitch interval to be physically regulated) Wp of 3 to 15 mm. The running speed of the fiber bundle 2 was adjusted to be within the range of 1 to 15 m/min in accordance with the horizontal distance L between the direction-changing rollers 5 of the oxidation oven 1 so that it was possible to take a sufficient amount of oxidation treatment time, and the process tension was adjusted to be within the range of 0.5 to 2.5 g/tex.

The obtained oxidized fiber bundle was then heat-treated in a precarbonization furnace at a maximum temperature of 700° C., then heat-treated in a carbonization furnace at a maximum temperature of 1400° C., and subjected to electrochemical treatment of fiber surface, and a sizing agent was applied to obtain a carbon fiber bundle.

Yarn gathering, fiber bundle break or the like due to contact between adjacent fiber bundles did not occur at all during the oxidation treatment of the fiber bundles 2, and the fiber bundles had extremely good process stability. Results of visual observation of the obtained oxidized fiber bundles and carbon fiber bundles showed that these fiber bundles were free from fuzzes and the like, and had extremely good quality. In addition, the running speed of the fiber bundle was sufficiently high, and oxidized fiber bundles and carbon fiber bundles were obtained with extremely high productivity.

Example 2

Except that the wind direction of the second hot air was at 45° with respect to the first hot air, the same procedure as in Example 1 was carried out.

Yarn gathering, fiber bundle break or the like due to contact between adjacent fiber bundles did not occur at all during the oxidation treatment of the fiber bundles 2, and the fiber bundles had extremely good process stability. Results of visual observation of the obtained oxidized fiber bundles and carbon fiber bundles showed that these fiber bundles were free from fuzzes and the like, and had extremely good quality. In addition, the running speed of the fiber bundle was sufficiently high, and oxidized fiber bundles and carbon fiber bundles were obtained with extremely high productivity.

Example 3

Except that the wind direction of the second hot air was at 20° with respect to the first hot air, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

Example 4

Except that the downward wind speed of the second hot air passing through the fiber bundle 2 in the oxidation oven 1 was ⅓ of the wind speed of the first hot air flowing around the fiber bundle, and the volume of hot air flowing downward in the second hot air during supply was ⅙ of the volume of the first hot air during supply, the same procedure as in Example 1 was carried out.

Yarn gathering, fiber bundle break or the like due to contact between adjacent fiber bundles did not occur at all during the oxidation treatment of the fiber bundles 2, and the fiber bundles had extremely good process stability. Results of visual observation of the obtained oxidized fiber bundles and carbon fiber bundles showed that these fiber bundles were free from fuzzes and the like, and had extremely good quality. In addition, the running speed of the fiber bundle was sufficiently high, and oxidized fiber bundles and carbon fiber bundles were obtained with extremely high productivity.

Example 5

Except that the downward wind speed of the second hot air passing through the fiber bundle 2 in the oxidation oven 1 was ⅚ of the wind speed of the first hot air flowing around the fiber bundle, and the volume of hot air flowing downward in the second hot air during supply was ½ of the volume of the first hot air during supply, the same procedure as in Example 1 was carried out.

Yarn gathering, fiber bundle break or the like due to contact between adjacent fiber bundles did not occur at all during the oxidation treatment of the fiber bundles 2, and the fiber bundles had extremely good process stability. Results of visual observation of the obtained oxidized fiber bundles and carbon fiber bundles showed that these fiber bundles were free from fuzzes and the like, and had extremely good quality. In addition, the running speed of the fiber bundle was sufficiently high, and oxidized fiber bundles and carbon fiber bundles were obtained with extremely high productivity.

Example 6

Except that the aperture ratio of the porous plate 13 on the lower surface on the supply nozzle 6 of the oxidation oven 1 was 80%, and the downward wind speed of the second hot air passing through the fiber bundle 2 was ¼ of the wind speed of the first hot air flowing around the fiber bundle, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

Example 7

Except that the porous plate 13 on the lower surface on the supply nozzle 6 of the oxidation oven 1 had a pore size of 8 mm and an aperture ratio of 30%, and the downward wind speed of the second hot air passing through the fiber bundle 2 was ⅞ of the wind speed of the first hot air flowing around the fiber bundle, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

Example 8

Except that the porous plate 13 on the lower surface on the supply nozzle 6 of the oxidation oven 1 had a pore size of 8 mm and an aperture ratio of 30%, and the volume of hot air flowing downward in the second hot air during supply was ⅛ of the volume of the first hot air during supply, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

Example 9

Except that the porous plate 13 on the lower surface on the supply nozzle 6 of the oxidation oven 1 had a pore size of 20 mm and an aperture ratio of 80%, and the volume of hot air flowing downward in the second hot air during supply was ⅗ of the volume of the first hot air during supply, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

Example 10

Except that the horizontal distance L between the direction-changing rollers 5 of the oxidation oven 1 was 10 m, the same procedure as in Example 1 was carried out.

Yarn gathering, fiber bundle break or the like due to contact between adjacent fiber bundles did not occur at all during the oxidation treatment of the fiber bundles 2, and the fiber bundles had extremely good process stability. Results of visual observation of the obtained oxidized fiber bundles and carbon fiber bundles showed that these fiber bundles were completely free from fuzzes and the like, and had extremely good quality. In addition, the running speed of the fiber bundle was extremely high, and oxidized fiber bundles and carbon fiber bundles were obtained with extremely high productivity.

Example 11

Except that the openings 12 on the lower surface of the supply nozzle 6 of oxidation oven 1 were provided at positions of 35% and 65% of the distance from the direction-changing roller 5 located at one end to the direction-changing roller 5 located at the other end of the outside of the heat treatment chamber 3, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

Example 12

Except that the oxidation oven 1 was of ETE type in which the supply nozzle 6 is disposed at one end and the suction nozzle 7 is disposed at the other end of the heat treatment chamber 3, the opening 12 on the lower surface of the supply nozzle 6 was provided at positions of 15% of the distance from the direction-changing roller 5 located at one end to the direction-changing roller 5 located at the other end of the outside of the heat treatment chamber 3, the same procedure as in Example 1 was carried out.

There was little yarn gathering, fiber bundle break or the like due to contact between adjacent fiber bundles during the oxidation treatment of the fiber bundles 2, and the fiber bundles had extremely good process stability. Results of visual observation of the obtained oxidized fiber bundles and carbon fiber bundles showed that these fiber bundles had little fuzzes and the like, and had good quality. In addition, the running speed of the fiber bundle was sufficiently high, and oxidized fiber bundles and carbon fiber bundles were obtained with extremely high productivity.

TABLE 1-1

| | | | Unit | Example 1 | Example 2 | Example 3 | Example 4 | Example 5 | Example 6 |
|---|---|---|---|---|---|---|---|---|---|
| Treatment conditions | Second hot air | Wind direction | ° | 90 | 45 | 20 | 90 | 90 | 90 |
| | | Supply position[Note 1] | % | 48/52 | 48/52 | 48/52 | 48/52 | 48/52 | 48/52 |
| | | Wind speed ratio[Note 2] | — | 1/2 | 1/2 | 1/2 | 1/3 | 5/6 | 1/4 |
| | | Air volume ratio[Note 3] | — | 1/4 | 1/4 | 1/4 | 1/6 | 1/2 | 1/4 |

TABLE 1-1-continued

|  |  | Unit | Example 1 | Example 2 | Example 3 | Example 4 | Example 5 | Example 6 |
|---|---|---|---|---|---|---|---|---|
| Apparatus configuration | Circulation method[Note 4] | — | CTE | CTE | CTE | CTE | CTE | CTE |
|  | Horizontal distance between direction-changing rollers | m | 20 | 20 | 20 | 20 | 20 | 20 |
|  | Supply nozzle opening — Installation position | — | Lower surface | Lower surface | Lower surface | Lower surface | Lower surface | Lower surface |
|  | Pore size | mm | 20 | 20 | 20 | 20 | 20 | 20 |
|  | Aperture ratio | % | 30 | 30 | 30 | 30 | 30 | 80 |
| Results | Contact probability P between adjacent fiber bundles | % | 6.1 | 6.3 | 9.8 | 6.4 | 6.8 | 7.4 |
|  | Process stability | — | Excellent: | Excellent: | Good | Excellent: | Excellent: | Excellent: |
|  | Quality | — | Excellent: | Excellent: | Good | Excellent: | Excellent: | Good |
|  | Productivity | — | Excellent: | Excellent: | Excellent: | Excellent: | Excellent: | Excellent: |

TABLE 1-2

|  |  | Unit | Example 7 | Example 8 | Example 9 | Example 10 | Example 11 | Example 12 |
|---|---|---|---|---|---|---|---|---|
| Treatment conditions | Second hot air — Wind direction | ° | 90 | 90 | 90 | 90 | 90 | 90 |
|  | Supply position[Note 1] | % | 48/52 | 48/52 | 48/52 | 48/52 | 35/65 | 15 |
|  | Wind speed ratio[Note 2] | — | 7/8 | 1/2 | 1/2 | 1/2 | 1/2 | 1/2 |
|  | Air volume ratio[Note 3] | — | 1/4 | 1/8 | 3/5 | 1/4 | 1/4 | 1/4 |
| Apparatus configuration | Circulation method[Note 4] | — | CTE | CTE | CTE | CTE | CTE | ETE |
|  | Horizontal distance between direction-changing rollers | m | 20 | 20 | 20 | 10 | 20 | 20 |
|  | Supply nozzle opening — Installation position | — | Lower surface | Lower surface | Lower surface | Lower surface | Lower surface | Lower surface |
|  | Pore size | mm | 8 | 8 | 20 | 20 | 20 | 20 |
|  | Aperture ratio | % | 30 | 30 | 80 | 30 | 30 | 30 |
| Results | Contact probability P between adjacent fiber bundles | % | 9.5 | 9.4 | 11.4 | 2.3 | 8.8 | 7.7 |
|  | Process stability | — | Good | Good | Good | Excellent: | Good | Excellent: |
|  | Quality | — | Good | Good | Good | Excellent: | Good | Good |
|  | Productivity | — | Excellent: | Excellent: | Excellent: | Good | Excellent: | Excellent: |

Comparative Example 1

Except that the openings 12 were provided on both the upper and lower surfaces of the supply nozzle 6 of the oxidation oven 1, the same procedure as in Example 1 was carried out.

Yarn gathering, fiber bundle break or the like due to contact between adjacent fiber bundles frequently occurred during the oxidation treatment of the fiber bundles 2, and workloads increased although it was possible to continue operations. Results of visual observation of the obtained oxidized fiber bundles and carbon fiber bundles showed that these fiber bundles had many fuzzes and the like, and had poor quality.

Comparative Example 2

Except that the opening 12 was provided on the upper surface of the supply nozzle 6 of the oxidation oven 1, the same procedure as in Example 1 was carried out.

Yarn gathering, fiber bundle break or the like due to contact between adjacent fiber bundles frequently occurred during the oxidation treatment of the fiber bundles 2 so that it was difficult to continue operations. Results of visual observation of the obtained oxidized fiber bundles and carbon fiber bundles showed that these fiber bundles had many fuzzes and the like, and had poor quality. In addition, the running speed of the fiber bundle 2 had to be reduced so that productivity considerably decreased.

Comparative Example 3

Except that the openings 12 were provided on both the upper and lower surfaces of the supply nozzle 6 of the oxidation oven 1, the same procedure as in Example 12 was carried out.

Yarn gathering, fiber bundle break or the like due to contact between adjacent fiber bundles frequently occurred during the oxidation treatment of the fiber bundles 2, and workloads increased although it was possible to continue operations. Results of visual observation of the obtained oxidized fiber bundles and carbon fiber bundles showed that these fiber bundles had many fuzzes and the like, and had poor quality.

Comparative Example 4

Except that the opening 12 was provided on the upper surface of the supply nozzle 6 of the oxidation oven 1, the same procedure as in Example 12 was carried out.

Yarn gathering, fiber bundle break or the like due to contact between adjacent fiber bundles frequently occurred during the oxidation treatment of the fiber bundles 2 so that it was difficult to continue operations. Results of visual observation of the obtained oxidized fiber bundles and carbon fiber bundles showed that these fiber bundles had many fuzzes and the like, and had poor quality. In addition, the running speed of the fiber bundle 2 had to be reduced so that productivity considerably decreased.

Comparative Example 5

Except that the wind direction of the second hot air was at 10° with respect to the first hot air, the same procedure as in Example 1 was carried out.

TABLE 2

|  |  |  | Unit | Comparative Example 1 | Comparative Example 2 | Comparative Example 3 | Comparative Example 4 | Comparative Example 5 |
|---|---|---|---|---|---|---|---|---|
| Treatment conditions | Second hot air | Wind direction | ° | 90 | 90 | 90 | 90 | 10 |
|  |  | Supply position[Note 1] | % | 48/52 | 48/52 | 15 | 15 | 48/52 |
|  |  | Wind speed ratio[Note 2] | — | 1/2 | 1/2 | 1/2 | 1/2 | 1/2 |
|  |  | Air volume ratio[Note 3] | — | 1/4 | 1/4 | 1/4 | 1/4 | 1/4 |
| Apparatus configuration | Circulation method[Note 4] |  | — | CTE | CTE | ETE | ETE | CTE |
|  | Horizontal distance between direction-changing rollers |  | m | 20 | 20 | 20 | 20 | 20 |
|  | Supply nozzle | Installation position | — | Both surfaces | Upper surface | Both surfaces | Upper surface | Lower surface |
|  | opening | Pore size | mm | 20 | 20 | 20 | 20 | 20 |
|  |  | Aperture ratio | % | 30 | 30 | 30 | 30 | 30 |
| Results | Contact probability P between adjacent fiber bundles |  | % | 19.1 | 22.5 | 20.4 | 23.8 | 19.5 |
|  | Process stability |  | — | Impossible | Impossible | Impossible | Impossible | Impossible |
|  | Quality |  |  | Good | Impossible | Impossible | Impossible | Impossible |
|  | Productivity |  |  | Good | Impossible | Good | Impossible | Good |

[Note 1] Distance from direction-changing roller located at one end to direction-changing roller 5 located at the other end of the outside of heat treatment chamber
[Note 2] Downward wind speed of second hot air passing through fiber bundle/wind speed of first hot air flowing around fiber bundle
[Note 3] Volume of hot air flowing downward in second hot air during supply/volume of first hot air during supply
[Note 4] CTE: Center To End type; ETE: End To End type

INDUSTRIAL APPLICABILITY

We provide a method of producing an oxidized fiber bundle and a carbon fiber bundle, and an oxidation oven, and is applicable to aerospace applications, leisure applications and general industrial applications.

The invention claimed is:

1. A method of producing an oxidized fiber bundle comprising heat-treating an acrylic fiber bundle aligned in a heat treatment chamber in which hot air is circulated while causing the acrylic fiber bundle to run on direction-changing rollers disposed on both ends of an outside of the heat treatment chamber, wherein
first hot air is supplied in a direction substantially parallel to a running direction of the acrylic fiber bundle between a pair of opposed direction-changing rollers, and second hot air is supplied from above the acrylic fiber bundle at an angle of 20 to 160° with respect to a wind direction of the first hot air, so that the second hot air passes at least a part of a running acrylic fiber bundle in a longitudinal direction.

2. The method according to claim 1, wherein a downward wind speed of the second hot air passing through the acrylic fiber bundle is ⅓ to ⅚ of a wind speed of the first hot air flowing around the acrylic fiber bundle.

3. The method according to claim 1, wherein a volume of hot air flowing downward in the second hot air during supply is ⅙ to ½ of a volume of the first hot air during supply.

4. The method according to claim 1, wherein a horizontal distance between the direction-changing rollers disposed at both ends on the outside of the heat treatment chamber is 15 m or more.

5. The method according to claim 1, wherein the second hot air passes through the acrylic fiber bundle at a position of 40 to 60% of a distance from the direction-changing roller located at one end to the direction-changing roller located at the other end of the outside of the heat treatment chamber.

6. A method of producing a carbon fiber bundle, wherein the oxidized fiber bundle obtained by the method according to claim 1 is subjected to precarbonization treatment at a maximum temperature of 300 to 1000° C. in an inert gas to obtain a precarbonized fiber bundle, and the precarbonized fiber bundle is subjected to carbonization treatment at a maximum temperature of 1000 to 2000° C. in an inert gas.

7. An oxidation oven for heat-treating an acrylic fiber bundle comprising:
(i) a heat treatment chamber having a slit through which aligned fiber bundles can enter and exit;
(ii) a plurality of supply nozzles disposed separately from one another in a vertical direction apart in the heat treatment chamber for supplying hot air including first hot air in a direction substantially parallel to a running direction of the fiber bundle between a pair of opposed direction-changing rollers;
(iii) a plurality of suction nozzles disposed separately from one another in a vertical direction in the heat treatment chamber for suctioning hot air supplied from the supply nozzle;
(iv) at least one blower that circulates hot air through the supply nozzle and the suction nozzle;
(v) at least one heater disposed on a flow channel for circulated hot air;
(vi) a direction-changing roller disposed outside the heat treatment chamber and reciprocating the fiber bundle two or more times in the heat treatment chamber through gaps between the adjacent suction nozzles; and
(vii) openings on lower surfaces of supply nozzles that supply second hot air at an angle of 20 to 160° with respect to a wind direction of the first hot air and allow passage of at least a part of a running fiber bundle in a longitudinal direction.

8. The oxidation oven according to claim 7, wherein the openings are in the form of a porous plate, and a pore size of the porous plate is 10 to 30 mm.

9. The oxidation oven according to claim 8, wherein an aperture ratio of the porous plate is 20 to 60%.

10. The oxidation oven according to claim 7, wherein the supply nozzle is disposed at a center of the heat treatment chamber and the suction nozzles are disposed at both ends of the heat treatment chamber.

* * * * *